(12) United States Patent
Wu

(10) Patent No.: US 11,966,135 B2
(45) Date of Patent: Apr. 23, 2024

(54) DISPLAY PANEL, DETECTION METHOD AND DISPLAY DEVICE

(71) Applicants: Chongqing Advance Display Technology Research, Chongqing (CN); Chongqing HKC Optoelectronics Technology Co., Ltd., Chongqing (CN)

(72) Inventor: Chuan Wu, Chongqing (CN)

(73) Assignees: Chongqing Advance Display Technology Research, Chongqing (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 519 days.

(21) Appl. No.: 17/272,601

(22) PCT Filed: Dec. 14, 2018

(86) PCT No.: PCT/CN2018/121241
§ 371 (c)(1),
(2) Date: Mar. 1, 2021

(87) PCT Pub. No.: WO2020/098045
PCT Pub. Date: May 22, 2020

(65) Prior Publication Data
US 2021/0373378 A1    Dec. 2, 2021

(30) Foreign Application Priority Data

Nov. 12, 2018  (CN) .......................... 201811339326.1

(51) Int. Cl.
*G01R 31/00* (2006.01)
*G02F 1/1362* (2006.01)
*G09G 3/00* (2006.01)

(52) U.S. Cl.
CPC .... *G02F 1/13629* (2021.01); *G02F 1/136254* (2021.01); *G09G 3/00* (2013.01)

(58) Field of Classification Search
CPC ............ G01R 31/2822; G01R 31/2825; G01R 31/2884; G01R 31/2886; G01R 31/2889;
(Continued)

(56) References Cited

U.S. PATENT DOCUMENTS

| | | | | |
|---|---|---|---|---|
| 2009/0273592 A1* | 11/2009 | Chien | .................. | G09G 3/3648 345/213 |
| 2012/0212401 A1* | 8/2012 | Bae | ...................... | G09G 3/3677 345/87 |

(Continued)

*Primary Examiner* — Thang X Le
(74) *Attorney, Agent, or Firm* — Conley Rose, P.C.; Grant Rodolph

(57) ABSTRACT

A display panel, including a pixel array; multiple rows of gate lines; and multiple columns of data lines; the gate lines and the data lines are perpendicular to each other, respectively, and every two gate lines are correspondingly connected to a row of sub-pixels, and each data line is correspondingly connected to two columns of sub-pixels; each row of pixels is correspondingly connected to two gate lines, and any two gate lines are parallel to each other; and there is a preset length difference between two adjacent rows of gate lines. The wiring of the display panel is convenient to be array detected, and improving the production yield of the display panel.

20 Claims, 4 Drawing Sheets

(58) Field of Classification Search
CPC .......... G01R 31/3025; G01R 31/31723; G01R 31/3641; G01R 29/0814; G01R 29/0878; G01R 29/26
See application file for complete search history.

(56) References Cited

U.S. PATENT DOCUMENTS

| | | | |
|---|---|---|---|
| 2013/0093734 A1* | 4/2013 | Wang ................... | G09G 3/3648 345/204 |
| 2015/0379947 A1* | 12/2015 | Sang .................... | G09G 3/3607 349/37 |
| 2016/0055807 A1* | 2/2016 | Lee ..................... | G02F 1/13624 345/99 |
| 2016/0203761 A1* | 7/2016 | Zhang .................. | G09G 3/3233 345/77 |
| 2018/0068626 A1* | 3/2018 | Zhao ................... | G09G 3/3655 |

\* cited by examiner

DISPLAY PANEL, DETECTION METHOD AND DISPLAY DEVICE

CROSS REFERENCE TO RELATED APPLICATION

The present application is an international application No. PCT/CN2018/121241, filed on Dec. 14, 2018, and claims priority of China patent application filed on Nov. 12, 2018 with Chinese patent Office, with application No. 201811339326.1, entitled "A display panel, a detection method and a display device", the whole content of which is incorporated herein by reference.

TECHNICAL FIELD

The present application relates to the field of display technology, and more particularly to a display panel, a detection method and a display device.

BACKGROUND

The statements herein only provide background information related to the present application, and do not necessarily constitute prior art. Matrix display panels are currently most commonly used in display devices, and the drive architecture of matrix display panels includes ordinary active drive architecture and half-source drive architecture. Compared with ordinary active drive architecture, the use of half-source drive architecture can reduce the total number of data lines and gate lines of the display panel, and save a lot of plates and reduce the manufacturing cost of the display panel.

However, based on the structural characteristics of the display panel of the half-source drive architecture, when the gate line of the display panel is tested in an array, the wide and narrow timing pulse signals cannot be identified, such that the display panel based on the half-source drive architecture cannot be detected, and the short circuit or open circuit of the gate line or the reference voltage line of the display panel cannot be detected, thereby the production yield of the display panel is decreased.

SUMMARY

An object of the present application is to provide a liquid crystal display panel, a detection method and a liquid crystal display, including but not limited to solve the technical problem that the display panel based on the half-source drive architecture cannot be detected, such that the short circuit or open circuit of the gate line or the reference voltage line of the display panel cannot be detected, resulting the production yield of the display panel being decreased.

The technical solution adopted by embodiment of the present application is to provide a display panel, including: a pixel array, multiple rows of gate lines; and multiple columns of data lines; wherein the gate lines and the data lines are perpendicular to each other, respectively, and every two gate lines are correspondingly connected to a row of sub-pixels, and each data line is correspondingly connected to two columns of sub-pixels; each row of pixels is correspondingly connected to two gate lines, and any two gate lines are parallel to each other; and there is a preset length difference between two adjacent rows of gate lines.

In an embodiment, lengths of all odd-numbered rows of gate lines are set to a first length, respectively; lengths of all even-numbered rows of gate lines are set to a second length, respectively; and the first length is greater than the second length.

In an embodiment, lengths of all odd-numbered rows of gate lines are set to a third length, respectively; lengths of all even-numbered rows of gate lines are set to a fourth length, respectively; and the third length is greater than the fourth length.

In an embodiment, ends of the gate lines configured for detection are set to be parallel to each other with an equal row spacing.

In an embodiment, a first portion of each gate line of the display panel connected to the sub-pixels is arranged in a straight line, and a second portion configured for array detection is arranged in a straight line or a broken line, wherein the first portion forms a complete gate line with the second portion.

In an embodiment, the ends of the even-numbered rows of gate lines are arranged in a broken line, and the broken line comprises a first line segment and a second line segment; the second line segments of the even-numbered rows of gate lines and the adjacent odd-numbered rows of gate lines are parallel to each other, and the row spacing therebetween is a first distance.

In an embodiment, the second line segments of the even-numbered rows of gate lines are parallel to two adjacent odd-numbered rows of gate lines, and row spacing between the second line segment and the adjacent odd-numbered rows of gate lines are equal.

In an embodiment, ends of the odd-numbered rows of gate lines are arranged in a broken line, and the broken line comprises a third line segment and a fourth line segment; and the fourth line segment of the odd-numbered rows of gate lines and adjacent even-numbered rows of gate lines are parallel to each other, and a row spacing therebetween is a second distance.

In an embodiment, the fourth line segments of the odd-numbered rows of gate lines are parallel to two adjacent even-numbered rows of gate lines, and row spacing between the fourth line segment and the adjacent odd-numbered rows of gate lines are equal.

In an embodiment, further comprises a plurality of reference voltage lines, one reference voltage line being provided between the two gate lines corresponding to each row of pixels, and each row of pixels being correspondingly connected to one of the reference voltage lines; and an end of any one of the reference voltage lines and any one of the gate lines are parallel to each other.

In an embodiment, an end of the reference voltage line is arranged in a broken line and ends of the even-numbered rows of gate lines are arranged in a broken line, and the broken line of the reference voltage line comprises a fifth line segment and a sixth line segment, the broken line of the even-numbered rows of gate lines comprises a seventh line segment and an eighth line segment; and the sixth line segment of any one of the reference voltage lines and the eighth line segment of any one of the even-numbered rows of gate lines are parallel to each other, and both are parallel to the odd-numbered rows of gate lines.

In an embodiment, a row spacing between the sixth line segment of the reference voltage line and the adjacent odd-numbered rows of gate lines is a third distance, and a row spacing between the sixth line segment of the reference voltage line and the eighth line segment of the adjacent even-numbered rows of gate lines is the third distance, and a row spacing between the eighth line segment of the adjacent even-numbered rows of gate lines and the adjacent odd-numbered rows of gate lines is the third distance.

In an embodiment, the eighth line segment of the even-numbered rows of gate lines and the sixth line segment of the reference voltage line and the odd-numbered rows of gate lines are parallel to each other, and row spacing of the sixth line segment of the reference voltage line and the eighth line segment is equal to that of the sixth line segment of the reference voltage line and the odd-numbered rows of gate lines.

In an embodiment, an end of the reference voltage line is arranged in a broken line and ends of the odd-numbered rows of gate lines are arranged in a broken line, and the broken line of the reference voltage line comprises a fifth line segment and a sixth line segment, the broken line of the odd-numbered row of gate lines comprises a ninth line segment and a tenth line segment; and the sixth line segment of any one of the reference voltage lines and the tenth line segment of any one of the odd-numbered rows of gate lines are parallel to each other, and both are parallel to the even-numbered rows of gate lines.

In an embodiment, a row spacing between the sixth line segment of the reference voltage line and the adjacent even-numbered rows of gate lines is a fourth distance, and a row spacing between the sixth line segment of the reference voltage line and the tenth line segment of the adjacent odd-numbered rows of gate lines is the fourth distance, and a row spacing between the tenth line segment of the adjacent even-numbered rows of gate lines and the adjacent even-numbered gate line is the fourth distance.

In an embodiment, the tenth line segment of the odd-numbered rows of gate lines and the sixth line segment of the reference voltage line and the even-numbered rows of gate lines are parallel to each other, and row spacing of the sixth line segment of the reference voltage line and the tenth line segment is equal to that of the sixth line segment of the reference voltage line and the even-numbered rows of gate lines.

Another object of the present application is to provide a detection method, including: outputting a first equal interval timing pulse signal to a gate line of a display panel; acquiring a second equal interval timing pulse signal output by the gate line; judging whether the gate line is faulty according to the first equal interval timing pulse signal and the second equal interval timing pulse signal; outputting a third equal interval timing pulse signal to a reference voltage line of a display panel; acquiring a fourth equal interval timing pulse signal output by the reference voltage line; and judging whether the reference voltage line is faulty according to the third equal interval timing pulse signal and the fourth equal interval timing pulse signal.

A further object of the present application is to provide a display device including: a display panel, and the display panel includes: a pixel array, multiple rows of gate lines; and multiple columns of data lines; wherein the gate lines and the data lines are perpendicular to each other, respectively, and every two gate lines are correspondingly connected to a row of sub-pixels, and each data line is correspondingly connected to two columns of sub-pixels; each row of pixels is correspondingly connected to two gate lines, and any two gate lines are parallel to each other; and there is a preset length difference between two adjacent rows of gate lines.

The display panel, the detection method and the display device provided by the embodiments of the present application, by wiring the gate of the display panel, there is a preset length difference between the gate lines in two adjacent rows, and the lengths of the adjacent gate lines are not equal, such that display panel is in a state where array detection can be performed, during the gate line fault detection, the short circuit or open circuit of the gate line can be detected, thereby improving the production yield of the display panel.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component. In the description of the present application, it needs to be understood that, directions or location relationships indicated by terms such as "up", "down", "left", "right" and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In order to illustrate the technical solutions described in the present application, detailed descriptions are given below in conjunction with specific drawings and embodiments.

The thin film transistor (TFT) array substrate of the display panel of the active drive structure includes: m data lines D1~Dm parallel to each other, n gate lines G1~Gn parallel to each other and insulated and intersected with the data lines, and the display panel of the half-source drive structure doubles the number of gate lines and reduces the number of data lines by half. Each row of sub-pixels corresponds to two gate lines, and each column of data lines corresponds to two columns of sub-pixels.

Figure 1:
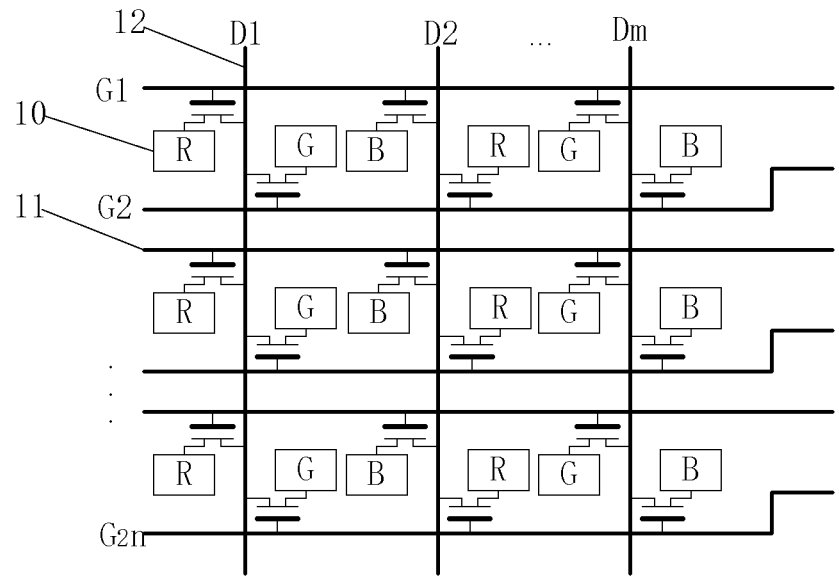
FIG. 1 is a schematic structural diagram of a display panel provided by an embodiment of the present application.

As shown in FIG. 1, a schematic structural diagram of a display panel provided by an embodiment of the present application. For ease of description, only the parts related to the embodiment of the present application are shown.

As shown in the figure, the display panel includes a pixel array 10, multiple gate lines 11, and multiple data lines 12, the gate lines and the data lines are perpendicular to each other, respectively, and every two gate lines are correspondingly connected to a row of sub-pixels, and each data line is correspondingly connected to two columns of sub-pixels; each row of pixels is correspondingly connected to two gate lines 11, and any two gate lines are parallel to each other; and there is a preset length difference between the gate lines in two adjacent rows; the preset length can be set according to the actual requirements of the specific size of the display panel, and the preset length difference is set to make the display panel in the detection state, so as to realize the array detection of the display panel. Every two columns of sub-pixels are connected to a data line 12, and any two data lines are parallel to each other; as shown in FIG. 1, 2n gate lines correspond to n rows of pixels, and m data lines correspond to 2m columns of sub-pixels; two adjacent rows of the gate lines are set to have unequal lengths; wherein m≥1, n≥1, and both m and n are positive integers.

Each row of sub-pixels in the pixel array includes multiple groups of sub-pixels, and each group of sub-pixels includes a first color sub-pixel, a second color sub-pixel, and a third color sub-pixel arranged in sequence. The colors of the sub-pixels in the same column are similarly, at least one of the first color sub-pixel, the second color sub-pixel, and the third color sub-pixel is a red sub-pixel, at least one is a green sub-pixel, and at least one is a blue sub-pixel.

In an embodiment, the lengths of all odd-numbered rows of gate lines are set to a first length, respectively; the lengths of all even-numbered rows of gate lines are set to a second length, respectively; and the first length is greater than the second length.

In an embodiment, the lengths of all odd-numbered rows of gate lines are set to a third length, respectively; the lengths of all even-numbered rows of gate lines are set to a fourth length, respectively; and the third length is greater than the fourth length.

In an embodiment, the lengths of all odd-numbered rows of gate lines may be different, the lengths of all even-numbered rows of gate lines may be different, and the lengths of even-numbered rows of gate lines and odd-numbered rows of gate lines are not equal.

In an embodiment, the number of rows and columns of the pixel array can be set according to specific needs, and the size of the pixel array is not particularly limited.

The present embodiment adopts a display panel based on a half-source drive architecture, every two gate lines are connected to one row of sub-pixels, the two gate lines connected to the same row of sub-pixels from a first interval, and the adjacent two rows of gate lines connected to different rows of sub-pixels from a second interval, since the first interval is not equal to the second interval, it is impossible to detect the path condition of the gate lines through a uniform pulse signal; by setting the gate lines to unequal lengths, the part of the gate line at the end of the gate line used for detection is drawn out, and it is convenient to set the gate lines used for the detection portion to be parallel to each other with equal row spacing to meet the conditions for detecting the path condition according to the gate lines of different lengths.

In an embodiment, the first portion of each gate line of the display panel connected to the sub-pixels is arranged in a straight line, and the second portion configured for array detection is arranged in a straight line or a broken line, wherein the first portion forms a complete gate line with the second portion.

In an embodiment, the display panel may include M rows×N columns of sub-pixels, that is, the display panel includes a sub-pixel array with M×N sub-pixels, and each column of sub-pixels includes multiple groups of sub-pixels, and each group of sub-pixels includes the first color sub-pixels, the second color sub-pixels and the third color sub-pixels that are arranged in sequence; where N≥1, M≥1 and M and N are all positive integers.

In an embodiment, in the above-mentioned pixel array, the colors of sub-pixels in the same column are the same, and the colors of sub-pixels in adjacent columns are different.

In an embodiment, the first color sub-pixel, the second color sub-pixel, and the third color sub-pixel are any one of a red sub-pixel, a green sub-pixel, a blue sub-pixel, and a white sub-pixel, respectively, and the colors of the first color sub-pixel, the second color sub-pixel, and the third color sub-pixel are different from each other.

Figure 2:
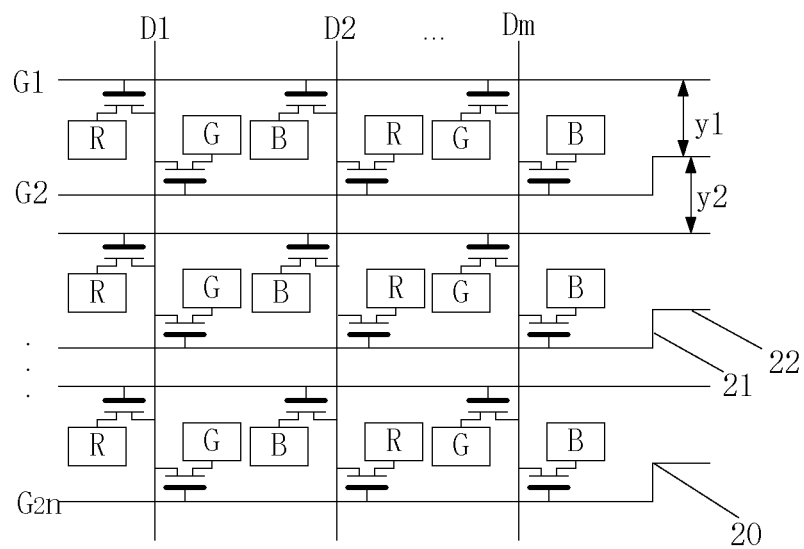
FIG. 2 is a specific schematic structural diagram of a display panel provided by an embodiment of the present application.

As shown in FIG. 2, the specific structural schematic diagram of the display panel provided by the embodiment of the present application, for ease of description, only the parts related to the embodiment of the present application are shown.

As shown in the figure, the ends of the even-numbered rows of gate lines are arranged in a broken line, and the broken line 20 includes a first line segment 21 and a second line segment 22; the second line segment 22 of the even-numbered rows of gate lines and the adjacent odd-numbered rows of gate lines are parallel to each other, and the row spacing therebetween is a first distance, that is, y1=y2; for example, for a 23.5-inch display device, the pixel spacing of the display panel is 381.75 microns, and the row spacing at the ends of the gate lines of the display panel is set to y1=y2=190.875 microns.

In an embodiment, the second line segments of the even-numbered rows of gate lines are parallel to two adjacent odd-numbered rows of gate lines, and row spacing between the second line segment and the adjacent odd-numbered rows of gate lines are equal; the second line segment of the even-numbered rows of gate lines and the gate line portion corresponding to the second line segment serve as the array detection portion, so that the gate line path condition can be detected by a detection signal with a uniform pulse width.

Figure 3:
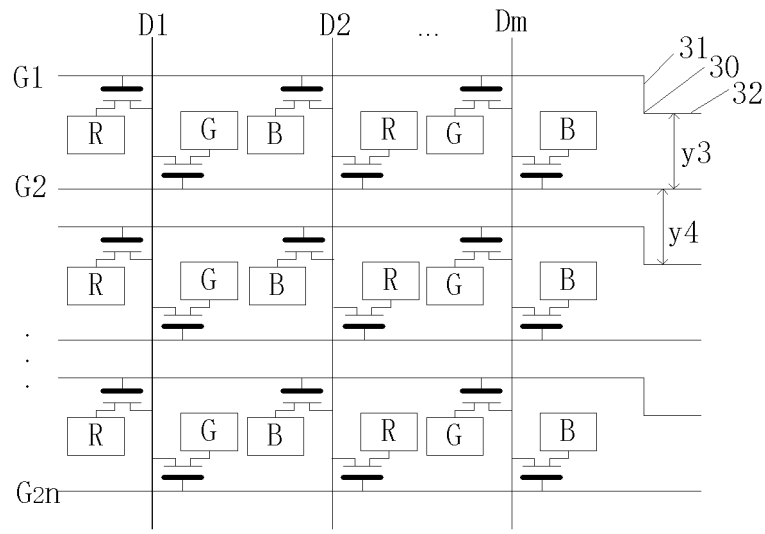
FIG. 3 is another specific schematic structural diagram of a display panel provided by an embodiment of the present application.

In an embodiment, FIG. 3 shows another specific structural diagram of the display panel provided by the embodiment of the present application, the ends of the odd-numbered rows of gate lines are arranged in a broken line, and the broken line 30 includes a third line segment 31 and a fourth line segment 32; the fourth line segment 32 of the odd-numbered rows of gate lines and the adjacent even-numbered rows of gate lines are parallel to each other, and a row spacing therebetween is a second distance, that is, y3=y4; for example, the pixel spacing of the display panel of a 32-inch display device is 510.75 microns, the row spacing at the ends of the gate lines of the display panel is set to y3=y4=255.375 microns.

In an embodiment, the fourth line segments of the odd-numbered rows of gate lines are parallel to two adjacent even-numbered rows of gate lines, and row spacing between the fourth line segment and the adjacent odd-numbered rows of gate lines are equal; the fourth line segment of the odd-numbered rows of gate lines and the even-numbered rows of gate lines portion corresponding to the fourth line segment serve as the array detection portion, so that the gate line path condition can be detected by a detection signal with a uniform pulse width.

In the embodiment of the present application, the end of all the gate lines of the display panel are kept at the same row spacing, so that during the array detection of the panel, the timing pulse signals of equal width and narrow can be used to detect short circuit or open circuit of the gate line of the display panel, to improve the production yield of the display panel.

Figure 4:
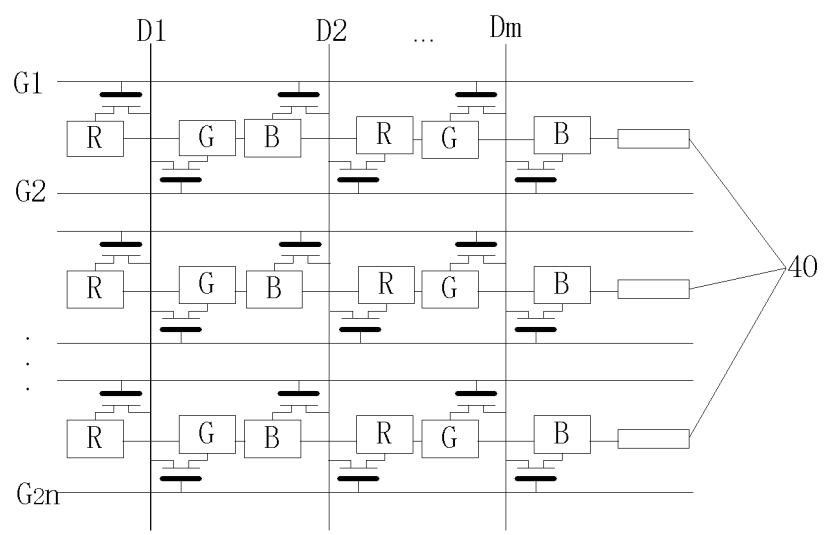
FIG. 4 is a schematic structural diagram of another display panel provided by an embodiment of the present application.

As shown in FIG. 4, an embodiment of the present application provides a schematic structural diagram of another display panel. For ease of description, only parts related to the embodiment of the present application are shown.

As shown in the figure, the display panel includes a pixel array, multiple rows of gate lines, and multiple columns of data lines; each pixel includes three sub-pixels of red, green, and blue; each row of pixels corresponds to two gate lines, and any two gate lines are parallel to each other; every two columns of sub-pixels are connected to a data line, and any two data lines are parallel to each other; for example: 2n gate lines correspond to n rows of pixels, m data lines correspond to 2m columns of sub-pixels; the lengths of the odd-numbered rows of gate lines are all the same, and the lengths of the even-numbered rows of gate lines are all the same. The display panel also includes a plurality of reference voltage lines 40, and one reference voltage line 40 is provided between the two gate lines corresponding to each row of pixels, and each row of pixels is correspondingly connected to one reference voltage line 40; the end of any one of the reference voltage lines is connected to any one of the gate lines, and the reference voltage line corresponding to each row of pixels is connected to one end of the pixel liquid crystal capacitor and one end of the storage capacitor in the same row.

Figure 5:
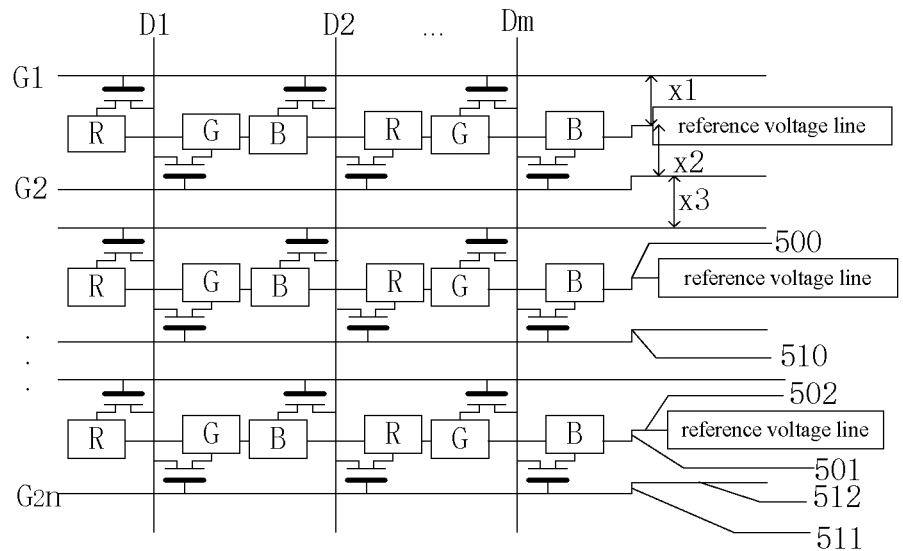
FIG. 5 is another specific schematic structural diagram of another display panel provided by an embodiment of the present application.

As shown in FIG. 5, an embodiment of the present application provides a schematic diagram of a specific structure of another display panel. For ease of description, only parts related to the embodiment of the present application are shown. The ends of the reference voltage lines are arranged in a broken line and the ends of the even-numbered rows of gate lines are arranged in a broken line. The broken line 500 of the reference voltage line includes a fifth line segment 501 and a sixth line segment 502, and the broken line 510 of the even-numbered rows of gate lines includes a seventh line segment 511 and a eighth line segment 512; the sixth line segment 502 of any one of the reference voltage lines and the eighth line segment 512 of any one of the even-numbered rows of gate lines are parallel to each other, and both are parallel to the odd-numbered row of gate lines. Among then, the row spacing between the sixth line segment 502 of the reference voltage line and the adjacent odd-numbered rows of gate lines is a third distance, and the row spacing between the sixth line segment 502 of the reference voltage line and the eighth line segment 512 of the adjacent even-numbered rows of gate lines is the third distance, and the row spacing between the sixth line segment 502 of the even-numbered rows of gate lines and the adjacent odd-numbered rows of gate lines is the third distance, that is, x1=x2=x3; for example: the pixel spacing of the display panel of the 23.5-inch display device is 381.75 microns, and the row spacing at the ends of the gate lines of the display panel is set to x1=x2=x3=127.25 microns.

In an embodiment, the eighth line segment of the even-numbered rows of gate lines and the sixth line segment of the reference voltage line and the odd-numbered rows of gate lines are parallel to each other, and row spacing of the sixth line segment of the reference voltage line and the eighth line segment is equal to that of the sixth line segment of the reference voltage line and the odd-numbered rows of gate lines; the sixth line segment, the eighth line segment, and the odd-numbered row gate line portions corresponding to the sixth line segment are served as the array detection portion, and the gate line path condition is detected by a detection signal with a uniform pulse width.

Figure 6:
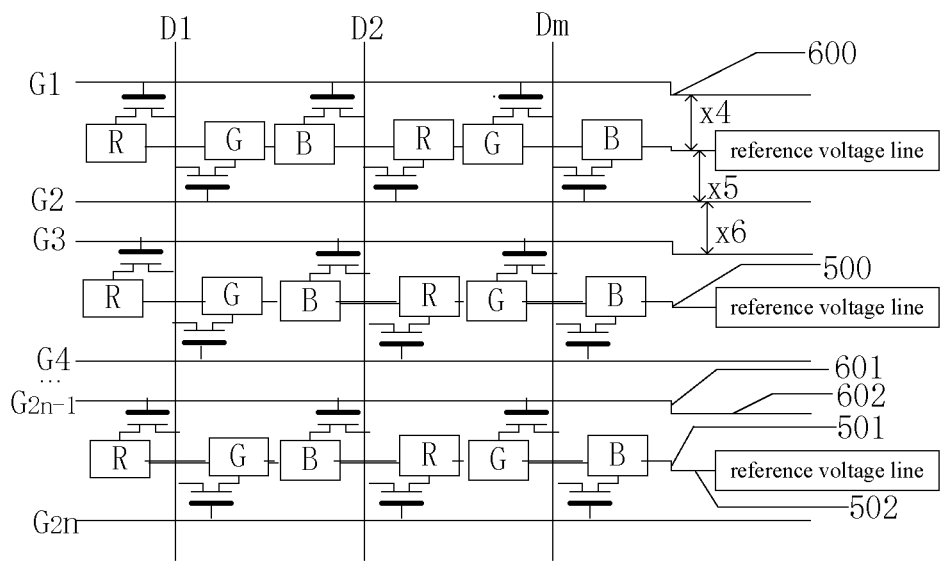
FIG. 6 is a schematic structural diagram of another display panel provided by an embodiment of the present application.

As shown in FIG. 6, an embodiment of the present application provides a schematic diagram of a specific structure of another display panel. For ease of description, only parts related to the embodiment of the present application are shown. The end of the reference voltage line is arranged in a broken line and ends of the odd-numbered rows of gate lines are arranged in a broken line, and the broken line of the reference voltage line includes a fifth line segment 501 and a sixth line segment 502, the broken line of the odd-numbered row of gate lines includes a ninth line segment 601 and a tenth line segment 602; and the sixth line segment 502 of any one of the reference voltage lines and the tenth line segment 602 of any one of the odd-numbered rows of gate lines are parallel to each other, and both are parallel to the even-numbered rows of gate lines. The row spacing between the sixth line segment 502 of the reference voltage line and the adjacent even-numbered rows of gate lines is a fourth distance, and the row spacing between the sixth line segment 502 of the reference voltage line and the tenth line segment 602 of the adjacent odd-numbered rows of gate lines is the fourth distance, and the row spacing between the tenth line segment 602 of the adjacent even-numbered rows of gate lines and the adjacent even-numbered gate line is the fourth distance, that is, x4=x5=x6; the pixel spacing of the display panel of the 32-inch display device is 510.75 microns, and the row spacing at the ends of the gate lines of the display panel is set to x4=x5=x6=170.25 microns.

In an embodiment, the tenth line segment of the odd-numbered rows of gate lines and the sixth line segment of the reference voltage line and the even-numbered rows of gate lines are parallel to each other, and row spacing of the sixth line segment of the reference voltage line and the tenth line segment is equal to that of the sixth line segment of the reference voltage line and the even-numbered rows of gate lines. The sixth line segment, the tenth line segment, and the even-numbered row gate line portions corresponding to the sixth line segment are served as the array detection portion, and the gate line path condition is detected by a detection signal with a uniform pulse width.

In the embodiment of the present application, the row spacing between the ends of the reference voltage lines and the ends of the odd-numbered rows of gate lines of the display panel are set equal to the row spacing between the end of the reference voltage lines and the ends of the even-numbered rows of gate lines, so that during the array detection of the panel, the detection of the detect short circuit or open circuit of the gate lines and the reference voltage lines of the display panel can be realized according to the uniform timing pulse signal, to improve the production yield of the display panel.

Figure 7:
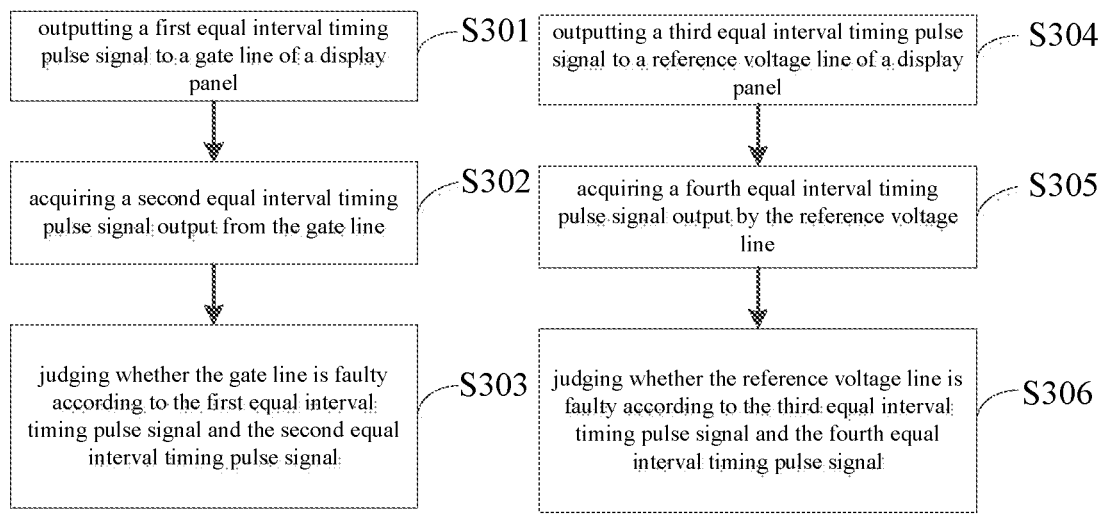
FIG. 7 is a schematic implementation flowchart of a detection method of a display panel provided by an embodiment of the present application.

As shown in FIG. 7, a schematic diagram of the implementation flow of the detection method of the display panel provided by the embodiment of the present application. The detection method is applied to the array detection of the above-mentioned display panel to improve the production yield of the display panel. The detection method may include the following steps:

Step S301, outputting a first equal interval timing pulse signal to a gate line of a display panel;

Step S302, acquiring a second equal interval timing pulse signal output from the gate line;

Step S303, judging whether the gate line is faulty according to the first equal interval timing pulse signal and the second equal interval timing pulse signal;

Step S304, outputting a third equal interval timing pulse signal to a reference voltage line of a display panel;

Step S305, acquiring a fourth equal interval timing pulse signal output by the reference voltage line; and Step S306, judging whether the reference voltage line is faulty according to the third equal interval timing pulse signal and the fourth equal interval timing pulse signal.

In this embodiment, in order to ensure that the results of the entire process of the display panel are within the control range and avoid the appearance of unqualified products, corresponding engineering inspections are performed after the wiring process of the panel pixel array is completed, and the display panel array detection of short circuit or open circuit inspection can be non-contact inspection; scanning the ends of the gate lines at a constant speed by a pulse signal generator, outputting an equal interval timing pulse signal to the gate lines, receiving a feedback equal interval timing pulse signal, and then judging whether the gate line or the reference voltage line is in a short circuit or open circuit according to the output timing pulse signal and the received timing pulse signal. The array scanning inspection of the gate lines can also be the detection device sending an electron beam signal to the gate lines. The received signal can be a secondary electron signal, the strength of the secondary electron signal is determined by the voltage difference between the voltage on the pixel and the detection device. The change in the amount of secondary electron signal reflects the voltage change on the pixel, and the voltage value between the defect and the normal is completely different, that is, it can be determined whether the gate line, reference voltage line or pixel electrode is in a short circuit or open circuit according to the change in voltage signal.

In the embodiments of the present application, the even-numbered rows of gate lines and the odd-numbered rows of gate lines are set to have different lengths, so that the gate lines have a preset length difference, which is convenient for setting the ends of the gate lines to be that the row spacing between the ends of the odd-numbered rows of gate lines and the even-numbered rows of gate lines are equal, and the row spacing between the end of the reference voltage line and the end of the even-numbered rows of gate lines is equal to the row spacing between the end of the reference voltage line and the end of the odd-numbered rows of gate lines, so that the display panel can be in a state of array detection, the gate lines and the reference voltage lines are scanned at a constant speed to detect the fault of the gate lines and the reference voltage lines, which saves the detection time, saves the cost of consumables, and does not damage the surface of the display panel, thereby the production yield rate of the display panel is improved.

It should be understood that the size of the sequence number of each step in the foregoing embodiment does not mean the order of execution. The execution sequence of each process should be determined by its function and internal logic, and should not constitute any limitation to the implementation process of the embodiment of the present application.

Figure 8:
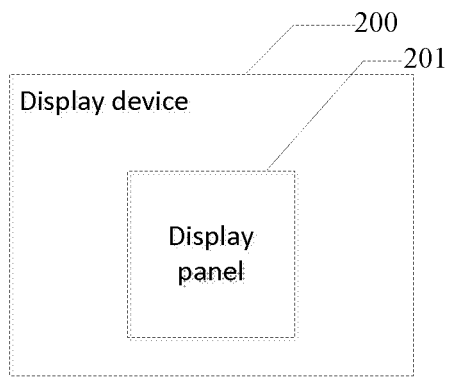
FIG. 8 is a schematic diagram of a display device provided by an embodiment of the present application.

Refer to FIG. 8, which is a schematic diagram of a display device provided by an embodiment of the present application. For ease of description, only the parts related to the embodiment of the present application are shown.

The display device 200 includes a display panel 201, wherein the display panel includes:

a pixel array, multiple rows of gate lines; and multiple columns of data lines; wherein the gate lines and the data lines are perpendicular to each other, respectively, and every two gate lines are correspondingly connected to a row of sub-pixels, and each data line is correspondingly connected to two columns of sub-pixels.

Each row of pixels is correspondingly connected to two gate lines, and any two gate lines are parallel to each other; and there is a preset length difference between two adjacent rows of gate lines.

In this embodiment, the display panel can be any type of display panel, for example, liquid crystal display panels based on LCD technology, or organic electroluminescence display panels based on OLED technology, quantum dot light emitting diodes display panels based on QLED technology or curved display panels, etc.

Those skilled in the art can understand that all or part of the processes in the above-mentioned embodiment methods can be implemented by instructing relevant hardware through a computer program. The program can be stored in a computer readable storage medium. During execution, it may include the procedures of the above-mentioned method embodiments. The storage medium may be a magnetic disk, an optical disc, a read-only memory (ROM), or a random access memory (RAM), etc.

The aforementioned embodiments are only optional embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A display panel, comprising:
a pixel array comprising a plurality of sub-pixels;
multiple rows of gate lines comprising odd-numbered rows and even-numbered rows, wherein any two gate lines are parallel to each other, wherein there is a preset length difference between two adjacent rows of gate lines, wherein each row of pixels is correspondingly connected to two gate lines, and wherein every two gate lines are connected to one row of the sub-pixels;

multiple columns of data lines, wherein each data line is connected to two columns of the sub-pixels, and wherein the gate lines and the data lines are perpendicular to each other; and a plurality of reference voltage lines, wherein one of the reference voltage lines is provided between the two gate lines corresponding to each row of pixels, wherein each row of pixels is correspondingly connected to one of the reference voltage lines, wherein an end of any one of the reference voltage lines and any one of the gate lines are parallel to each other, wherein an end of the reference voltage line is arranged in a broken line and ends of the even-numbered rows of gate lines are arranged in a broken line, wherein the broken line of the reference voltage line comprises a fifth line segment and a sixth line segment, wherein the broken line of the even-numbered rows of gate lines comprises a seventh line segment and an eighth line segment, wherein the sixth line segment of any one of the reference voltage lines and the eighth line segment of any one of the even-numbered rows of gate lines are parallel to each other and are parallel to the odd-numbered rows of gate lines.

2. The display panel of claim 1, wherein lengths of all odd-numbered rows of the gate lines are set to a first length, wherein lengths of all even-numbered rows of the gate lines are set to a second length, and wherein the first length is greater than the second length.

3. The display panel of claim 1, wherein lengths of all odd-numbered rows of the gate lines are set to a third length, wherein lengths of all even-numbered rows of the gate lines are set to a fourth length, and wherein the third length is greater than the fourth length.

4. The display panel of claim 1, wherein ends of the gate lines configured for detection are set to be parallel to each other with an equal row spacing.

5. The display panel of claim 1, wherein a first portion of each gate line is arranged in a straight line, wherein a second portion of each gate line is configured for array detection and is arranged in a straight line or a broken line, and wherein the first portion forms a complete gate line with the second portion.

6. The display panel of claim 1, wherein the ends of the even-numbered rows of the gate lines are arranged in a broken line, wherein the broken line comprises a first line segment and a second line segment, wherein the second line segment of the even-numbered rows of gate lines and the adjacent odd-numbered rows of gate lines are parallel to each other, and wherein a row spacing between the even-numbered rows of gate lines and the adjacent odd-numbered rows of gate lines is a first distance.

7. The display panel of claim 6, wherein the second line segment of the even-numbered rows of gate lines are parallel to two adjacent odd-numbered rows of gate lines, and wherein row spacing between the second line segment and the adjacent odd-numbered rows of gate lines are equal.

8. The display panel of claim 1, wherein ends of the odd-numbered rows of gate lines are arranged in a broken line, wherein the broken line comprises a third line segment and a fourth line segment, wherein the fourth line segment of the odd-numbered rows of gate lines and adjacent even-numbered rows of gate lines are parallel to each other, and wherein a row spacing therebetween is a second distance.

9. The display panel of claim 8, wherein the fourth line segment of the odd-numbered rows of gate lines are parallel to two adjacent even-numbered rows of gate lines, and wherein row spacing between the fourth line segment and the adjacent odd-numbered rows of gate lines are equal.

10. The display panel of claim 1, wherein a row spacing between the sixth line segment of the reference voltage line and the adjacent odd-numbered rows of gate lines is a third distance, wherein a row spacing between the sixth line segment of the reference voltage line and the eighth line segment of the adjacent even-numbered rows of gate lines is the third distance, and wherein a row spacing between the eighth line segment of the adjacent even-numbered rows of gate lines and the adjacent odd-numbered rows of gate lines is the third distance.

11. The display panel of claim 10, wherein the eighth line segment of the even-numbered rows of gate lines and the sixth line segment of the reference voltage line and the odd-numbered rows of gate lines are parallel to each other, and wherein row spacing of the sixth line segment of the reference voltage line and the eighth line segment is equal to that of the sixth line segment of the reference voltage line and the odd-numbered rows of gate lines.

12. A display panel, comprising:
a pixel array comprising a plurality of sub-pixels;
multiple rows of gate lines comprising odd-numbered rows and even-numbered rows, wherein any two gate lines are parallel to each other, wherein there is a preset length difference between two adjacent rows of gate lines, wherein each row of pixels is correspondingly connected to two gate lines, and wherein every two gate lines are connected to one row of the sub-pixels;

multiple columns of data lines, wherein each data line is connected to two columns of the sub-pixels, and wherein the gate lines and the data lines are perpendicular to each other; and a plurality of reference voltage lines, wherein one of the reference voltage lines is provided between the two gate lines corresponding to each row of pixels, wherein each row of pixels is correspondingly connected to one of the reference voltage lines, wherein an end of any one of the reference voltage lines and any one of the gate lines are parallel to each other, wherein an end of the reference voltage line is arranged in a broken line and ends of the odd-numbered rows of gate lines are arranged in a broken line, wherein the broken line of the reference voltage line comprises a fifth line segment and a sixth line segment, wherein the broken line of the odd-numbered row of gate lines comprises a ninth line segment and a tenth line segment, wherein the sixth line segment of any one of the reference voltage lines and the tenth line segment of any one of the odd-numbered rows of gate lines are parallel to each other and are parallel to the even-numbered rows of gate lines.

13. The display panel of claim 12, wherein a row spacing between the sixth line segment of the reference voltage line and the adjacent even-numbered rows of gate lines is a fourth distance, wherein a row spacing between the sixth line segment of the reference voltage line and the tenth line segment of the adjacent odd-numbered rows of gate lines is the fourth distance, and wherein a row spacing between the tenth line segment of the adjacent even-numbered rows of gate lines and the adjacent even numbered gate line is the fourth distance.

14. The display panel of claim 13, wherein the tenth line segment of the odd-numbered rows of gate lines and the sixth line segment of the reference voltage line and the even-numbered rows of gate lines are parallel to each other, and wherein row spacing of the sixth line segment of the reference voltage line and the tenth line segment is equal to that of the sixth line segment of the reference voltage line and the even-numbered rows of gate lines.

15. The display panel of claim 12, wherein lengths of all odd-numbered rows of the gate lines are set to a first length, wherein lengths of all even-numbered rows of the gate lines are set to a second length, and wherein the first length is greater than the second length.

16. The display panel of claim 12, wherein lengths of all odd-numbered rows of the gate lines are set to a third length, wherein lengths of all even-numbered rows of the gate lines are set to a fourth length, and wherein the third length is greater than the fourth length.

17. The display panel of claim 12, wherein ends of the gate lines configured for detection are set to be parallel to each other with an equal row spacing.

18. The display panel of claim 12, wherein a first portion of each gate line is arranged in a straight line, wherein a second portion of each gate line is configured for array detection and is arranged in a straight line or a broken line, and wherein the first portion forms a complete gate line with the second portion.

19. A display device comprising:
 a display panel, wherein the display panel comprises:
  a pixel array comprising a plurality of sub-pixels;
  multiple rows of gate lines comprising odd-numbered rows and even-numbered rows, wherein any two gate lines are parallel to each other, wherein there is a preset length difference between two adjacent rows of gate lines, wherein each row of pixels is correspondingly connected to two gate lines, and wherein every two gate lines are connected to one row of the sub-pixels;
  multiple columns of data lines, wherein each data line is connected to two columns of the sub-pixels, and wherein the gate lines and the data lines are perpendicular to each other; and
  a plurality of reference voltage lines, wherein one of the reference voltage lines is provided between the two gate lines corresponding to each row of pixels, wherein each row of pixels is correspondingly connected to one of the reference voltage lines, wherein an end of any one of the reference voltage lines and any one of the gate lines are parallel to each other, wherein an end of the reference voltage line is arranged in a broken line and ends of the even-numbered rows of gate lines are arranged in a broken line, wherein the broken line of the reference voltage line comprises a fifth line segment and a sixth line segment, wherein the broken line of the even-numbered rows of gate lines comprises a seventh line segment and an eighth line segment, wherein the sixth line segment of any one of the reference voltage lines and the eighth line segment of any one of the even-numbered rows of gate lines are parallel to each other and are parallel to the odd-numbered rows of gate lines.

20. A display panel, comprising:
 a pixel array;
 multiple rows of gate lines comprising odd-numbered rows and even-numbered rows; and
 multiple columns of data lines, wherein the gate lines and the data lines are perpendicular to each other, wherein every two gate lines are correspondingly connected to a row of sub-pixels, wherein each data line is correspondingly connected to two columns of sub-pixels, wherein each row of pixels is correspondingly connected to two gate lines, wherein any two gate lines are parallel to each other, and wherein there is a preset length difference between two adjacent rows of gate lines; and
 a plurality of reference voltage lines, wherein one reference voltage line is provided between the two gate lines corresponding to each row of pixels, wherein each row of pixels is correspondingly connected to one of the reference voltage lines, wherein an end of any one of the reference voltage lines and any one of the gate lines are parallel to each other, wherein an end of the reference voltage line is arranged in a broken line, wherein the ends of the odd-numbered rows of gate lines are arranged in a broken line, wherein the broken line of the reference voltage line comprises a fifth line segment and a sixth line segment, wherein the broken line of the odd-numbered row of gate lines comprises a ninth line segment and a tenth line segment, and wherein the sixth line segment of any one of the reference voltage lines and the tenth line segment of any one of the odd-numbered rows of gate lines are parallel to each other and are parallel to the even-numbered rows of gate lines.

* * * * *